United States Patent [19]

Ohzono et al.

[11] Patent Number: 4,716,791
[45] Date of Patent: Jan. 5, 1988

[54] INFINITELY VARIABLE TRANSMISSION UTILIZING HYDRAULIC FLUID PRESSURE TO VARY VELOCITY RATIO BETWEEN DRIVING AND DRIVEN PULLEYS

[75] Inventors: Kohei Ohzono, Fujimi; Mitsuru Saito, Koganei; Kiyotaka Hayashi, Urawa, all of Japan

[73] Assignee: Honda Giken Kogyo K.K., Tokyo, Japan

[21] Appl. No.: 838,366

[22] Filed: Mar. 11, 1986

[30] Foreign Application Priority Data

| Mar. 12, 1985 | [JP] | Japan | 60-047374 |
| Mar. 13, 1985 | [JP] | Japan | 60-0934700[U] |
| May 2, 1985 | [JP] | Japan | 60-093852 |
| May 2, 1985 | [JP] | Japan | 60-093850 |

[51] Int. Cl.⁴ ............ B60K 41/12; B60K 41/16
[52] U.S. Cl. ........................ 74/867; 474/18; 474/28; 192/3.57
[58] Field of Search ............ 74/867, 868; 474/18, 474/28; 192/3.57, 103 F

[56] References Cited

U.S. PATENT DOCUMENTS

| 3,083,801 | 4/1963 | Frohner | 192/3.57 |
| 3,600,961 | 8/1971 | Rattunde | 474/12 X |
| 3,782,213 | 1/1974 | Rattunde | 474/28 |
| 4,143,558 | 3/1979 | van Deursen et al. | 474/28 |
| 4,161,894 | 7/1979 | Giacosa | 74/863 |
| 4,348,197 | 9/1982 | Oliver | 474/28 |
| 4,439,170 | 3/1984 | Steuer | 484/18 X |
| 4,552,545 | 11/1985 | Koivunen | 474/28 X |
| 4,592,457 | 6/1986 | Cadee | 192/103 F X |
| 4,644,968 | 2/1987 | Chatterjea | 192/357 X |

FOREIGN PATENT DOCUMENTS

5298861 8/1977 Japan.

*Primary Examiner*—Dirk Wright
*Attorney, Agent, or Firm*—Arthur L. Lessler

[57] ABSTRACT

An infinitely variable transmission in which the pitches of a driving pulley and a driven pulley are variable by means of hydraulic fluid pressure to vary the velocity ratio between the two pulleys. A lower pressure fluid and a higher pressure fluid are created from a hydraulic fluid from a hydraulic fluid supply source, with a constant pressure difference therebetween. The lower pressure fluid has its pressure value varied in response to the velocity ratio. The lower pressure fluid and the higher pressure fluid are selectively supplied to the movable pulley elements of the driving pulley and driven pulley. A hydraulic clutch and a pressure regulating valve are connected together by a hydraulic fluid supply passageway which is selectively closed and opened by a supply control valve. A drain passage is connected to the hydraulic fluid supply passageway to allow hydraulic fluid to escape from the hydraulic clutch when the passageway is closed by the supply control valve. In at least one movable pulley element, an orifice is formed through a sealing element which seals between an inner peripheral surface of a cylindrical portion and a radially extending annular flange of a stationary piston element to communicate between first and second hydraulic pressure chambers defined within an annular space in a pulley main body at opposite sides of the annular flange of the stationary piston element.

12 Claims, 16 Drawing Figures

| FIG.1A | FIG.1B |

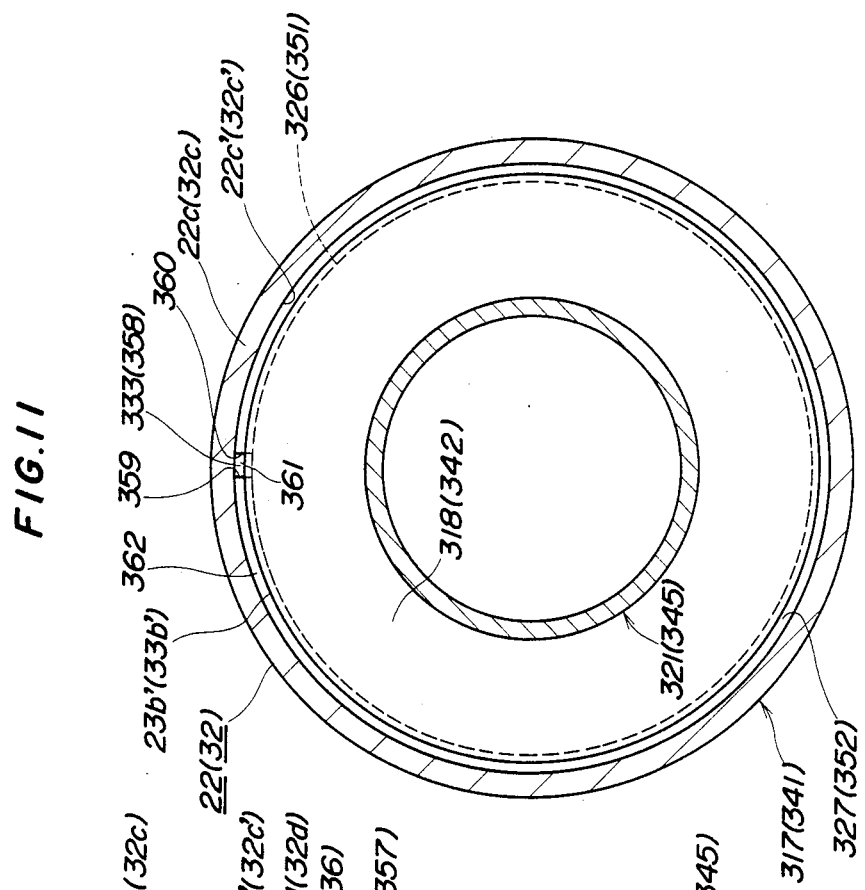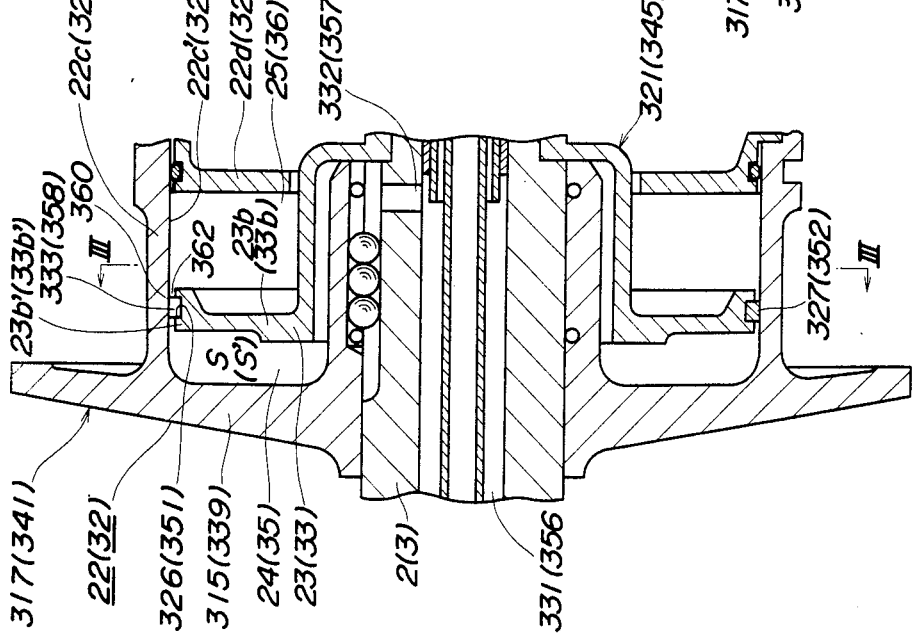

INFINITELY VARIABLE TRANSMISSION UTILIZING HYDRAULIC FLUID PRESSURE TO VARY VELOCITY RATIO BETWEEN DRIVING AND DRIVEN PULLEYS

BACKGROUND OF THE INVENTION

This invention relates to an infinitely variable transmisssion of the type that the transmission ratio is controllable through change of the pitches of the pulleys.

An infinitely variable transmission is already known in which a driving shaft and a driven shaft are connected by means of an endless belt wound around a driving pulley provided on the driving shaft and a driven pulley provided on the driven shaft, the driving pulley and the driven pulley have respective movable pulley elements mounted, respectively, on the driving shaft and the driven shaft for sliding movement thereon by means of a hydraulic fluid so as to vary the pitches of the respective driving shaft and the driven shaft to thereby change the velocity ratio between the driving and driven shafts, i.e. the transmission ratio, and a hydraulic clutch connected to the driven shaft and adapted to become engaged to permit transmission of power from a prime mover such as an internal combustion engine to the driving shaft when the rotational speed of the engine is higher than a predetermined value.

In the conventional infinitely variable transmission, the pitches of the driving and driven pulleys are controlled by means of a hydraulic fluid (pressurized oil) supplied from a hydraulic pressure source, to such values as to achieve velocity ratios between the driving and driven shafts appropriate to operating conditions of the prime mover such as an internal combustion engine. It is a requisite that appropriate pinch forces should be applied to the movable pulley elements upon setting of the pitches of the pulleys, so as not to degrade the power transmission efficiency even at the time of changing the transmission ratio.

To meet this requirement, it has been proposed, e.g. by Japanese Provisional Patent Publication No. 52-98861 to apply a required a pinch force to the movable pulley element of the driven pulley, and at the same time apply to the movable pulley element of the driving pulley a pinch force which is larger than or smaller than the pinch force applied to the movable pulley element of the driven pulley, by a fixed amount at the time of changing the transmission ratio. It has also been proposed, e.g. by U.S. Pat. No. 3,600,961, to create a higher pressure hydraulic fluid having a fixed higher pressure and a lower pressure hydraulic fluid having a lower pressure relative to the fixed higher pressure and variable in response to the transmission ratio assumed or a like parameter, the lower pressure hydraulic fluid being utilized to control a pintch force applied to the movable pulley element of the driving pulley or the driven pulley, wherein the higher pressure hydraulic fluid is applied to the movable pulley element that pushes forward the endless belt, whereas the lower pressure hydraulic fluid is applied to the other movable pulley element that receives the endless belt thus pushed forward. FIG. 6 shows a pinch force characteristic according to the former proposal, and FIG. 7 one according to the latter proposal, respectively.

However, in either of the two proposal, a higher pinch force than an actually required one is obtained in a certan transmission ratio region, resulting in large pressure loss. Furthermore, according to the former proposal the same hydraulic pressure is applied to both the driving pulley and the driven pulley, requiring a large piston area difference commensurate with the transmission ratio changing load and accordingly necessitating making one of the movable pulley elements large in size. On the other hand, according to the latter proposal the use of the higher pressure hydraulic fluid makes it necessary to employ a high pressure-type oil pump as the hydraulic fluid supply source.

Another problem with the aforementioned conventional infinitely variable transmission is as follows: The infinitely variable transmission receives power transmitted from the prime mover or internal combustion engine to be driven thereby when the hydraulic clutch becomes engaged. Therefore, it is necessary to brake the transmission at its output side so as to allow warming-up operation of the engine at a somewhat high rotational speed, which, however, forms an unnecessarily large load on the transmission system. This problem can be solved by designing the transmission to have a neutral position to be assumed during warming-up operation of the engine. However, this solution cannot be applied to the aforementioned infinitely variable transmission, because it is structurally difficult to provide such a neutral position in this type transmission. This is why a mechanical type or gear type transmission with a neutral position is additionally provided in combination with the infinitely variable transmission.

Still another problem with the conventional inifinitely variable transmission is as follows: The movable pulley element of either of the driving pulley and driven pulley is provided with a first hydraulic pressure chamber disposed to have hydraulic pressure therein urge the movable pulley element toward the stationary pulley element, a second hydraulic pressure chamber adjacent to the first hydraulic pressure chamber, and a restriction passage communicating between the first and second hydraulic pressure chambers, whereby part of the hydraulic fluid within the first hydraulic pressure chamber leaks through the restriction passage into the second hydraulic pressure chamber so as to cancel an excessive pressure force in excess of the required initial set pressure force, produced in the first hydraulic pressure chamber due to a centrifugal force caused by rotation of the pulley. The above restriction passage is formed in a stationay piston defining part of the first hydraulic pressure chamber. However, the operation of drilling the restriction passage is rather complicated and difficult to perform, requiring an expensive tool.

SUMMARY OF THE INVENTION

It is an object of the invention to provide an infinitely variable transmission which is capable of applying appropriate pinch forces to the movable pulley elements so as not to spoil the power transmission efficiency, even at the transmission ratio-changing operation.

Another object of the invention is to provide an infinitely variable transmission in which the hydraulic clutch can assume a neutral position, thereby dispensing with the need of providing a mechanical transmission.

A further object of the invention is to provide an infinitely variable transmission which is provided with the restriction passage which can be formed in an easy and simple manner, can positively leak part of the hydraulic fluid therethrough from the first hydraulic pressure chamber to the second hydraulic pressure chamber, from the initial stage of supply of the hydraulic fluid into the first hydraulic pressure chamber, and can be designed to enable free setting of the leakage amount, The present invention provides an inifinitely variable transmission of the type including a driving shaft, a driven shaft, a driving pulley composed of a first stationary pulley element and a second movable pulley element both provided on the driving shaft, a driven pulley composed of a second stational pulley element and a second movabel pulley element both provided on the driven shaft, an endless belt wound around the driving pulley and the driven pulley for connecting between the driving shaft and the driven shaft for transmitting power from the former to the latter, and a hydraulic fluid supply source for supplying a hydraulic fluid to the first and second movable pulley elements, wherein the first and second movable pulley elements are axially displaceable relative to respective corresponding ones of the first and second stationary pulley elements by means of the hydraulic fluid from the hydraulic fluid supply source, to vary the gaps between the first and second movable pulley elements and the respective corresponding stationary pulley elements and accordingly the velocity ratio between the driving shaft and the driven shaft.

The infinitely variable transmission is characterized by comprising control means operatively connected between the first and second movable pulley elements and the hydraulic fluid supply source. The control means comprises pressure creating means for creating a lower pressure fluid and a higher pressure fluid from the hydraulic fluid from the hydraulic fluid supply source, with a constant pressure difference between the lower pressure fluid and the higher pressure fluid, and modulating means for varying a pressure value of the lower pressure fluid created by the pressure creating means in response to a velocity ratio between the driving shaft and the driven shaft, and selective supply means for supplying the lower pressure fluid created by the pressure creating means and varied by the modulating means and the higher pressure fluid created by the pressure creating means selectively to the first movable pulley element and the second movable pulley element.

Preferably, the modulating means comprises a stationary cylinder disposed to be supplied with the hydraulic pressure fluid, a movable cylinder slidably fitted within the stationary cylinder for axial movement therein in response to a change in the velocity ratio between the driving and driven shafts, a piston slidably fitted within the movable cylinder, spring means permanently urging the piston in one direction, a hydraulic fluid tank, and port means provided in the peripheral wall of the movable cylinder at such a location as to be closable by the piston and communicating with the hydraulic fluid tank, wherein the piston is reponsive to the pressure of the lower pressure fluid from the pressure creating means for axial movement against the force of the spring means in a direction of the port means being opened to drain the hydraulic pressure fluid within the stationary cylinder to the hydraulic fluid tank.

The above and other objects, features and advantages of the invention will be more apparent from the ensuing detailed description taken in conjunction with the accompanying drawings, in which like reference characters designate the same or similar elements or parts throughout the figures thereof.

BRIEF DESCRIPTION OF THE DRAWINGS

FIG. 10 is a fragmentary sectional view of essential part of a movable pulley element of the infinitely variable transmission according to the invention;

FIG. 11 is a sectional view taken along the line III—III in FIG. 10;

DETAILED DESCRIPTION

The invention will now be described in detail with reference to the drawings showing embodiments of the invention.

Figure 1A:
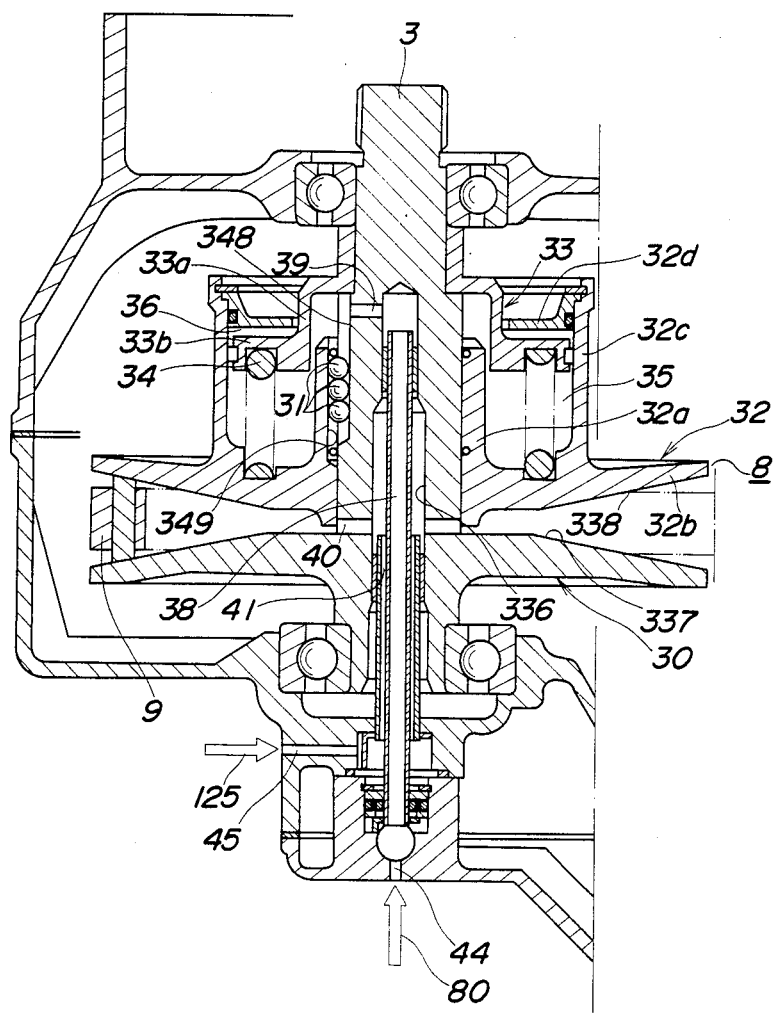
FIGS. 1A and 1B, is a sectional view illustrating the construction of an infinitely variable transmission for automotive vehicles according to the invention.
Figure 1B:
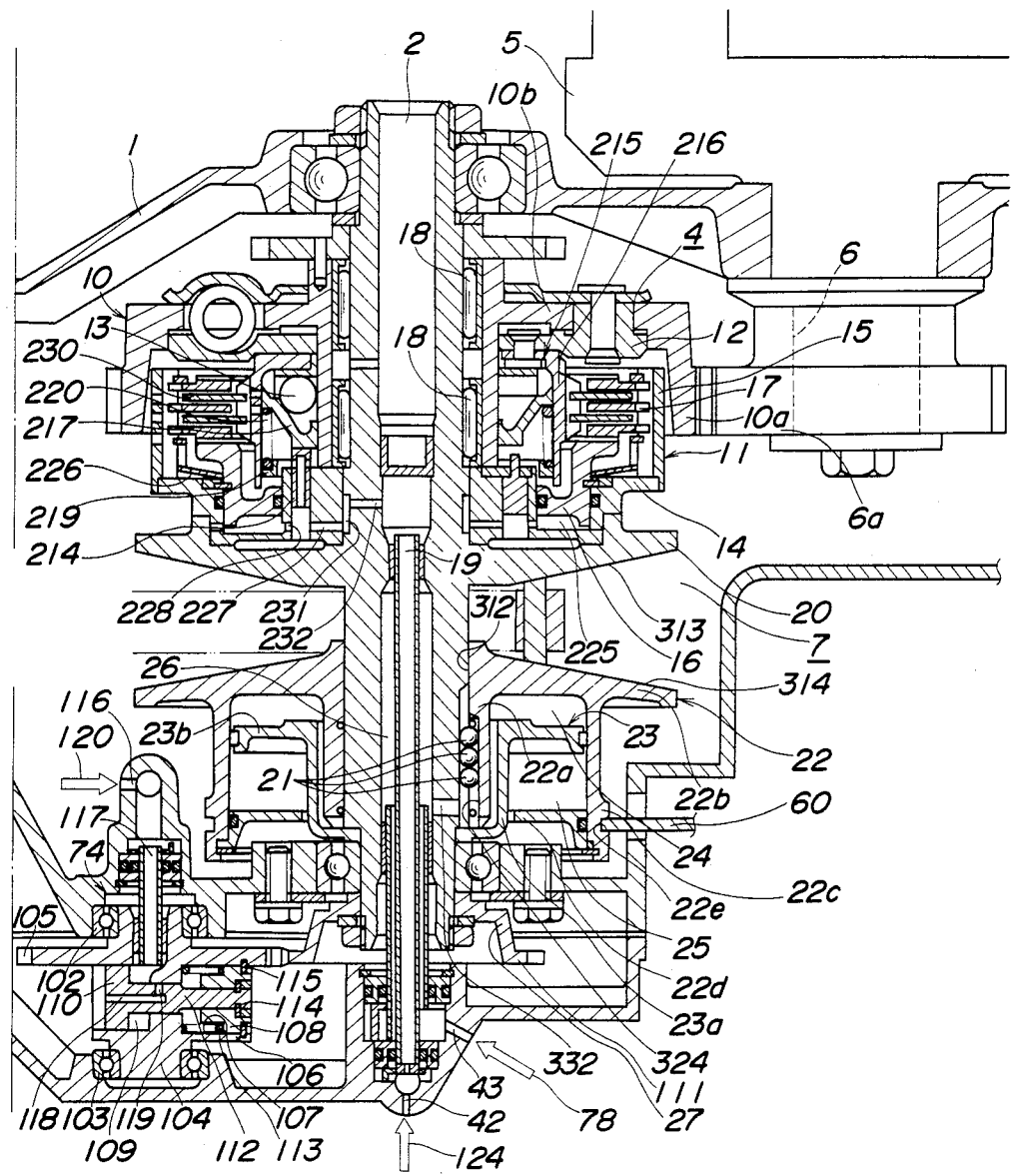
Figure 1:
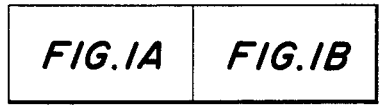
FIG. 1, which is divided into
Figure 2:
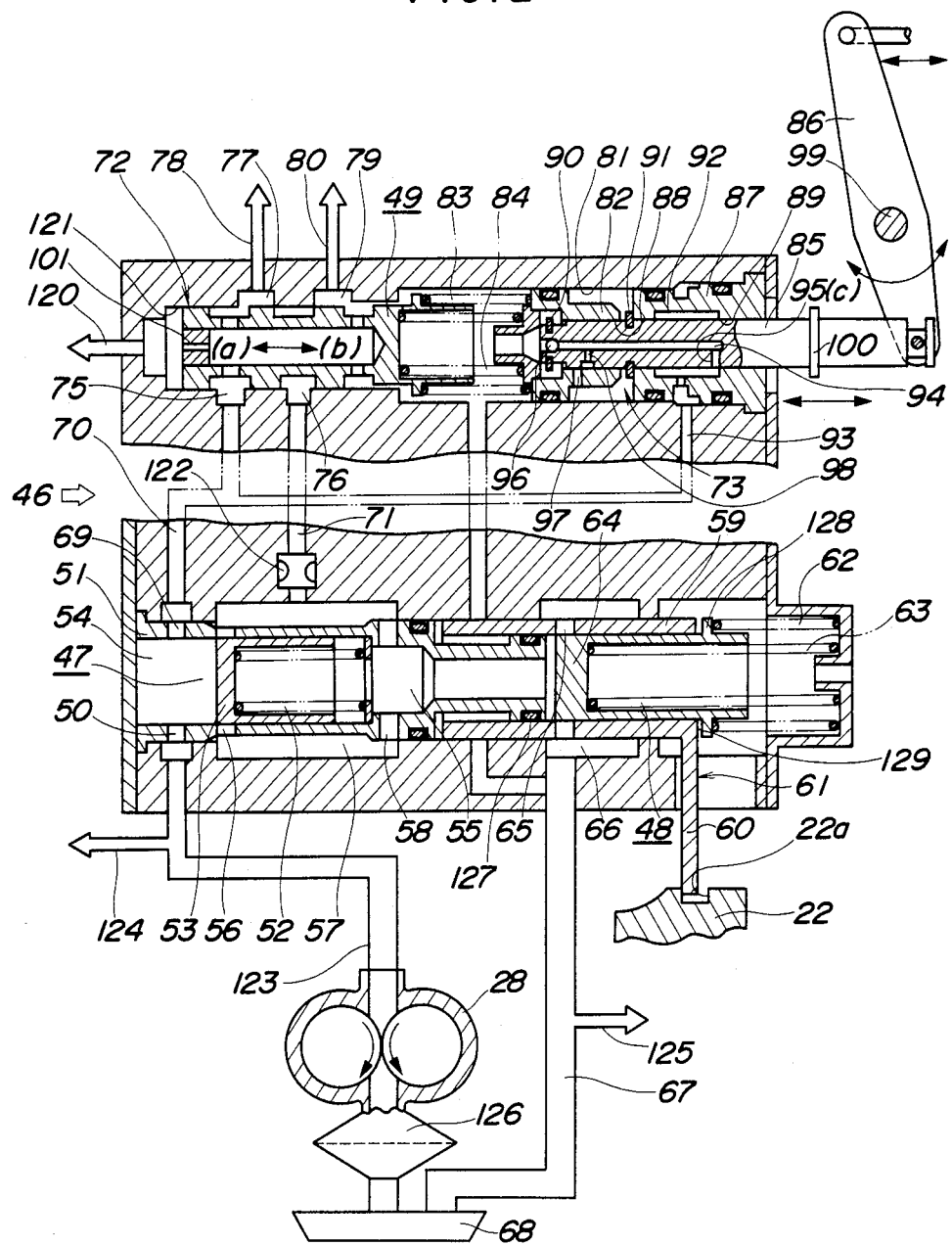
FIG. 2 is a sectional view of a control device for the infinitely variable transmission illustrated in FIG. 1.

Referring first to FIG. 1, there is illustrated the whole arrangement of an inifinitely variable automatic transmission for automotive vehicles according to the present invention. FIG. 2 illustrates a control device for the inifinitely variable automatic transmission. Reference numeral 1 designates a casing, 2 a driving shaft, 3 a driven shaft, 4 a hydraulic type starting clutch connected to the driving shaft 2 and adapted to permit transmission of the rotational force of an output shaft 6 of an internal combustion engine 5 to the driving shaft 3, 7 a driving pulley provided on the driving shaft 2, 8 a driven pulley provided on the driven shaft 3, 9 an endless belt (e.g. a steel belt) wound around the driving pulley 7 and the driven pulley 8 to transmit the rotational force of the driving shaft 2 to the driven shaft 3.

The starting clutch 4 comprises an input rotating member 10 formed of a clutch cylinder 14 and a clutch outer element 15 and interlocked with the output shaft 6, an output rotating member 11 interlocked with the driving shaft 2, a clutch damper mechanism 12 mounted on the input rotating member 10, a pressure regulating valve control mechanism (centrifugal governor mechanism) 13 mounted on the input rotating member 10, a clutch piston 16 received within the clutch cylinder 14, and friction plates 17 mounted within the clutch outer element 15. The input rotating member 10 is rotatably fitted on the driving shaft 2 wia bearings 18, and has an outer gear 10a meshing with a gear 6a of the output shaft 6. The output rotating member 11 is force fitted on the driving shaft 2 in a manner circumferentially immovable relative thereto.

The starting clutch 4 thus constructed is disposed to be operated by hydraulic fluid flowing in a hydraulic fluid guide passage 19 extending in the driving shaft 2 along its axis, as described later, and is arranged such that, when the rotation speed of the output shaft 6 exceeds a predetermined value, the input rotating member 10 is displaced toward the output rotating member 11, whereby the clutch engages to transmit the torque of the output shaft 6 to the driving shaft 2.

The driving pulley 7 comprises a conical discshaped stationary pulley element 20 integrally formed on the driving shaft 2 at a location close to the starting clutch 4, and a movable pulley element 22 axially slidably fitted on the driving shaft 2 via a plurality of balls 21 in a manner not rotatable about its own axis and facing the stationary pulley element 20. The movable pulley element 22 has a conical disc-shaped pulley main body 22b radially extending integrally from an outer periphery of its cylindrical boss 22a at one end thereof, and also a cylindrical wall 22c axially extending integrally from the pulley main body 22b in a direction away from the stationary pulley element 20. The movable pulley element 22 cooperates with an annular closing plate 22d fitted within the interior of the cylinder-shaped wall 22c to form a closed drum.

A stationary piston element 23 is fitted in the movable pulley element 22. The stationary piston element 23 comprises a cylindrical body 23a which has one end face formed with a shaft-fitting bore, the other end face being open, and an annular flange 23b radially extending integrally from the other end. The shaft-fitting bore of the stationary piston element 23 receives the driving shaft 2 in such a manner that the stationary piston element 23 is axially slidable but not rotatable about the shaft 2. The cylindrical body 23a is loosely fitted on the boss 22a of the movable pulley element 22, and the outer peripheral surface of the flange 23b is slidably fitted within the inner surface of the cylindrical wall 22c of the movable pulley element 22 in a liquid tight manner.

A first hydraulic pressure chamber 24 is defined within the movable pulley element 22 between the pulley main body 22b and the flange 23b of the stationary piston element 23, and a second hydraulic pressure chamber 25 within the same element 22 between the closing plate 22d of the movable pulley element 22 and the flange 23b of the stationary piston element 23. These first and second hydraulic pressure chambers 24 and 25 are connected to a pump 28, referred to later, via a port 332 radially formed in the driving shaft 2 and the hydraulic fluid guide passage 26 formed around the hydraulic fluid guide passage 19 in the driving shaft 2.

When the driving pulley 7 is in a position shown in FIG. 1, it assumes the maximum pitch, and as hydraulic fluid flows into the first hydraulic pressure chamber 24 through the port 332, the movable pulley element 22 shifts toward the stationary pulley element 20 to thereby reduce the pitch.

The driven pulley 8 comprises a stationary pulley element 30 formed integrally on the driven shaft 3, and a movable pulley element 32 axially slidably fitted on the driving shaft 3 via a plurality of balls 31 in a manner not rotatable about its own axis and facing the stationary pulley element 30.

The movable pulley element 32 has an conical disc-shaped pulley main body 32b radially extending integrally from an outer periphery of its cylindrical boss 32a at one end thereof, and also a cylindrical wall 32c, with a diameter about a half of that of the disc-shaped pulley main body 32b, axially extending integrally from the pulley main body 32b in a direction away from the stationary pulley element 30. The movable pulley element 32 in cooperation with an annular closing plate 32d engaged inwardly with the cylinder-shaped wall 32c forms a closed drum. Incidentally, the inner diameter of the cylindrical wall 32c is about the same as that of the cylinderical wall 22c of the movable pulley element 22.

A stationary piston element 33 is fitted in the movable pulley element 32. The stationary piston element 33 comprises a cylindrical body 33a which has one end face formed with a shaft-fitting bore, the other end face being open, and an annular flange 33b radially extending integrally from the other end. The shaft-fitting bore of the stationary piston element 33 receives the driven shaft 3 in such a manner that the stationary piston element 33 is not axially slidable and not rotatable about the shaft 2. The cylindrical body 33a, is loosely fitted on the boss 32a of the movable pulley element 32, and the outer peripheral surface of the flange 33b is slidably fitted within the inner surface of the cylindrical wall 32c of the movable pulley element 32 in a liquid tight manner.

A coil spring 34 is captured between the pulley main body 32b of the movable pulley elemt 32 and the flange 33b of the stationary piston element 33, and is disposed to urge the movable pulley 32 toward the stationary piston element 33 (in the direction of pitch reduction). This coil spring 34 is adapted to give appropriate tension to the endless belt 9 while the internal combustion engine 5 is at rest, as well as to set the movable pulley element 32 to its initial position.

A first hydraulic pressure chamber 35 is defined within the movable pulley element 32 between the pulley main body 32b and the flange 33b of the stationary piston element 33, and a second hydraulic pressure chamber 36 within the same element 32 between the closing plate 32d of the movable pulley element 32 and the flange 33b of the stationary piston element 33.

These first hydraulic pressure chamber 35 is connected to a pump 28, referred to later, via a port 39 radially formed in the driven shaft 3 and the hydraulic fluid guide passage 38 extending in the driven shaft 3 along its axis.

Formed through the driving shaft 3 in the vicinity of the diametric center of the stationary pulley element 30 is a radial bore 40 disposed to communicate the interior of the hydraulic fluid guide passage 38 with the outside. The radial bore 40 is closed and opened by the boss 32a of the movable pulley element 32, as the pulley element 32 shifts rightward and leftward, respectively, as viewed in FIG. 1. When the bore 40 is open, the hydraulic fluid flowing in a hydraulic fluid guide passage 41 flows out of the driven shaft 3 through the bore 40 to thereby supply the belt with the fluid for lubrication.

When the driven pulley 8 is in a position shown in FIG. 1, it assumes the minimum pitch, whereby the first hydraulic pressure chamber 35 is supplied with the maximum. amount of hydraulic fluid. As fluid flows out of the first hydraulic pressure chamber 35 through a port 39, the pulley element 32 can be shifted by the belt pinch force against the force of the spring 34 away from the stationary pulley element 30 or in a direction of the pulley pitch becoming lesser.

Incidentally, the hydraulic fluid from the pump 28 (FIG. 2) enters the hydraulic fluid guide passage 19 via a port 42, the hydraulic fluid guide passage 26 via a port 43, the hydraulic fluid guide passage 38 via a port 44, and the hydraulic fluid guide passage 41 via a port 45, respectively.

In the infinitely variable automatic transmission according to the invention constructed as above, the rotational force of the driving shaft 2 is transmitted to the driven shaft 3 via the endless belt 9, the driving pulley 7, and the driven pulley 8. By changing the pitches of the driving pulley 7 and the driven pulley 8 through shifting of the movable pulley elements 22, 32 by means of the hydraulic fluid, it is possible to infinitely vary the velocity ratio between the driving shaft 2 and the, driven shaft 3.

Referring next to FIG. 2, a control device 46 will be described, which controls the pitches of the driving pulley 7 and the driven pulley 8 of the infinitely variable automatic transmission.

The control means 46 is arranged across a hydraulic fluid passageway connecting the pump 28 as the hydraulic fluid source with the ports 43 and 44, and comprises pressure creating means 47 for creating a lower pressure fluid and a higher pressure fluid with a constant pressure differece therebetween from the hydraulic fluid from the pump 28, and modulating means 48 for varying the pressure value of the lower pressure fluid created by the pressure creating means 47 in response to the velocity ratio between the driving shaft 2 and the driven shaft 3, and selective supply means 49 for selectively supplying the lower pressure fluid or the higher pressure fluid created by the pressure creating means 47 to the movable pulley element 22 of the driving pulley 7 and the movable pulley element 32 of the driven pulley 8 in response to the operating conditions of the internal combustion engine (the prime mover) 5.

The pressure creating means 47, the modulating means 48, and the selective supply means 49 may be arranged within the casing 1 at suitable locations.

The pressure creating means 47 comprises a cylinder 51 disposed to temporarily receive hydraulic fluid supplied from the pump 28 via a port 50, and a differential pressure regulating piston 53 slidably received within the cylinder 51 and disposed to be displaced by the pressure of hydraulic fluid against the force of the differential pressure regulating spring 52. The differential pressure regulating piston 53 has a cylindrical shape with one end closed, and is arranged within the cylinder 51 such that a chamber 54 and a chamber 55 are defined by respective opposite end faces of the cylinder 51. The differential pressure regulating piston 53 is displaced toward the chamber 55 by the pressure of hydraulic fluid entering the chamber 54 via the port 50 to open a port 56, when the fluid pressure exceeds a predetermined value PA set by the differential pressure regulating spring 52. Hence, the pressure difference between the hydraulic fluid in the chamber 55 and that in the chamber 54 is always equal to the predetermined value PA. In FIG. 2, the differential pressure regulating piston 53 is seen to assume a non-differential pressure creating position wherein the differential pressure regulating spring 52 is not compressed, and on this occasion the port 56 is fully closed by the differential pressure regulating piston 53. The differential pressure regulating piston 53 is displaceable at least through a stroke from the no-differential pressure creating position to a position wherein it fully opens the port 56.

Figure 4:
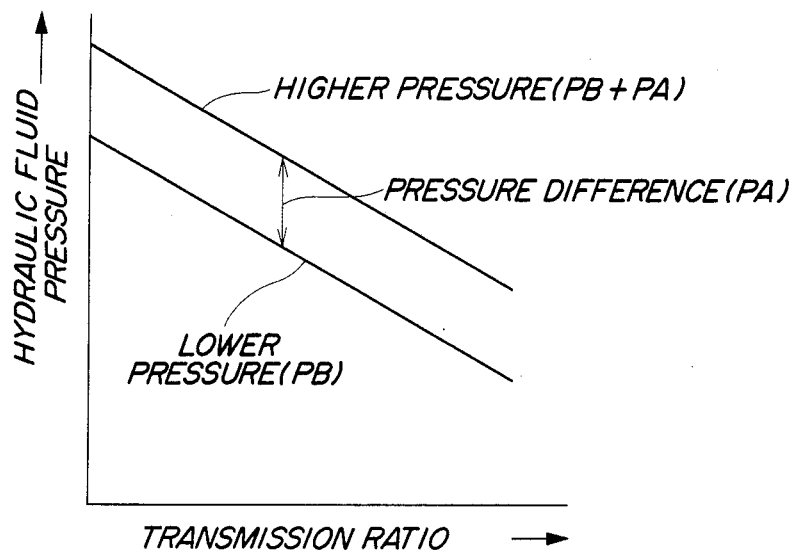
FIG. 4 is a graph illustrating the relationship between high pressure of hydraulic fluid and low pressure of hydraulic fluid which are created by the control device, plotted with respect to velocity ratio.

The modulating means 48 comprises a sleeve 59 slidably fitted on the cylinder 51 of the pressure creating means 47, velocity-responsive means 61 having a lever 60 engaged at its one end in a groove 22e formed in the outer periphery surface of the movable pulley element 22 and thereby interlocks the sleeve 59 with the movable pulley element 22, for movement in unison, and an interlocking adjuster piston 64 received within the sleeve 59 and disposed to be displaced by the pressure of hydraulic fluid in the chamber 55 against the force of interlocking adjuster springs 62, 63. The interlocking adjuster piston 64 is forced to be displaced away from the chamber 55 to thereby open a port 65, when the pressure of the hydraulic pressure in the chamber 55 becomes greater than a predetermined pressure (PB) set by the interlocking adjuster springs 62, 63. As the port 65 is thus opened, part of the hydraulic fluid in the chamber 55 returns to a tank 68 via the port 65, a chamber 66, and a hydraulic fluid return passage 67. Since the sleeve 59 with the port 65 is interlocked with the movable pulley element 22, the position of the port 65 is variable is response to a change in the transmission ratio. Therefore, the pressure PB varies with a change in the transmission ratio, as shown in FIG. 4.

When the sleeve 59 slides, it is resisted only by the sliding friction of sealing means 127, but resisted directly by the pressure of hydraulic fluid and the reaction forces of the interlocking adjuster springs 62, 63, so that the operating load on the sleeve 59 is small, and the friction between the lever 60 and the movable pulley element 22 is so small that the movable pulley element 22 scarcely receives a braking forcerom the sleeve 59. Generally, in practicing the transmission interlocking function, the set length of of the interlocking adjuster spring is adjusted by the interlocking parts. However, inconveniences with this practice include comparatively large operation load and friction between the interlocking parts to brake the movement of the pulley element 22.

Figure 3:
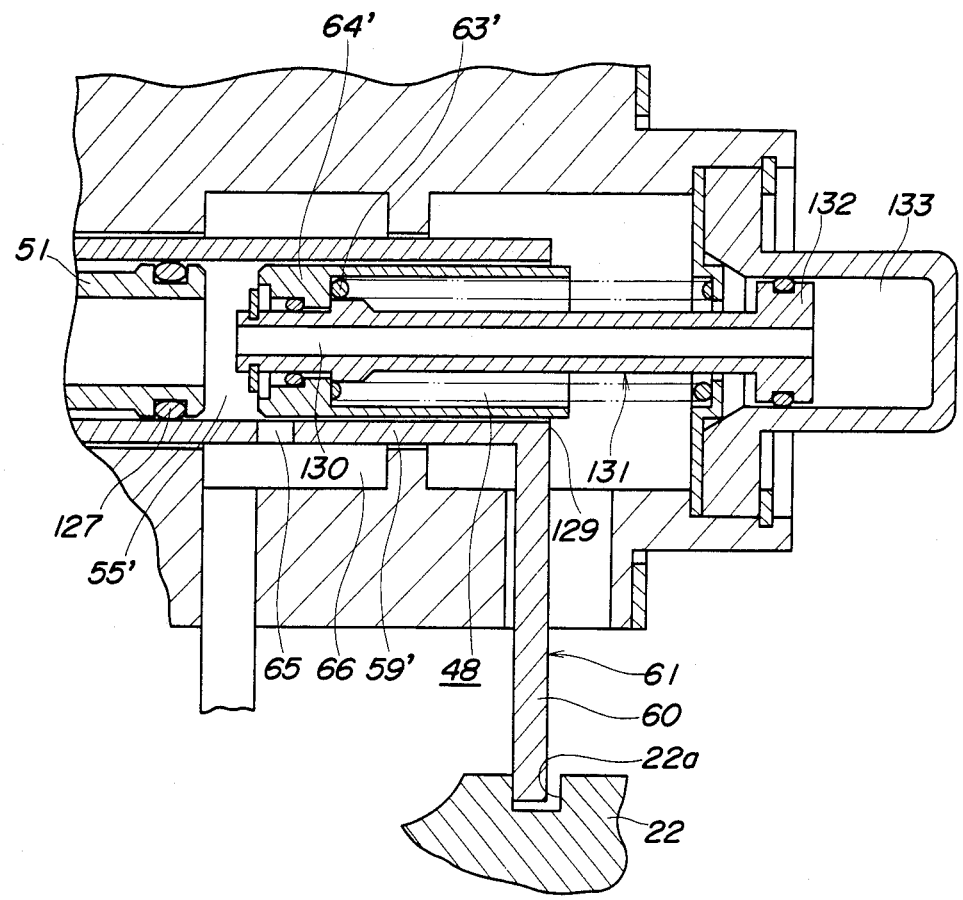
FIG. 3 is a sectional view illustrating a transmission interlock mechanism of the control device in FIG. 2.

In the modulating means 48 as described above, the pressure of hydraulic fluid prevailing in the chamber 55 is determined by the combined forces of the interlocking adjuster springs 62, 63 which urgingly engage the interlocking adjuster piston 64 at the outside and the inside thereof, respectively. However, when no hydraulic fluid pressure acts upon the interlocking adjuster piston 64 to move same, a flange 128 provided on the outer periphery surface of the interlocking adjuster piston 64 for receiving the interlocking adjuster spring 62 is contacted and pressed against an end face 129 of the sleeve 59 by the restitution forces of the interlocking adjuster springs 62, 63. If this takes place while the sleeve 59 is sliding, the sleeve 59 is counteracted by the reaction forces of the interlocking adjuster springs 62, 63, whereby the movable pulley element 22 can receive a braking force from the sleeve 59. Also, it is possible to secure an adequate amount of hydraulic fluid by increasing the diameter of the interlocking adjuster piston 64, which, however, results in a greater reaction force being received by the interlocking adjuster springs 62, 63, and thus the maximum pressure of the hydraulic fulid that can be set is unfavorably limited. These problems can be solved by an arrangement shown in FIG. 3. In the figure, a piston rod 131 formed with a hydraulic fluid passage 130 axially extending therethrough is axially received within an interlocking adjuster piston 64′. The piston rod 131 has a piston portion 132 slidably received within a cylinder 133, and the.hydraulic fluid passage 130 is disposed to introduce part of the hydraulic fluid in a chamber 55′ into the cylinder 133. According to this arrangement, the pressure of hydraulic fluid introduced into the cylinder 133 and acting on the piston member 132 performs the e function as the interlocking adjuster spring 62, thus omitting the interlocking adjuster spring 62. Hence the interlocking adjuster piston 64′ has no protrusion corresponding to the flange 128 in FIG. 2 on its outer periphery, so that even when no hydraulic fluid pressure acts. on the interlocking adjuster piston 64′, the reaction force of the interlocking adjuster spring 63′ does not act on a sleeve 59′. Furthermore, by virtue of provision of the cylinder 133, communicating with the chamber 55′ via the hydraulic fluid passage 130, a desired amount of hydraulic fluid is always secured in the chamber 55′ without increasing the diameter of the interlocking adjuster piston 64′.

The selective supply means 49 comprises the ratio selecting spool valve (four-port valve) 72, first operating means 73, and second operating means 74. The ratio selecting spool valve 72 is disposed to selectively supply to the ports 43 and 44 hydraulic fluid with higher pressure flowing in the high pressure passage 70 after being temporarily delivered into the chamber 54 of the pressure creating means 47 and hydraulic fluid with lower pressure flowing in a low pressure passage 71 from the chamber 57 after having its pressure modulated. The first operating means 73 is connected to one end of the ratio selecting spool valve 72 to operate the ratio selecting spool valve 72 in response to the throttle valve opening of the engine 5. The second operating means 74 is connected to other end of the ratio selecting spool valve 72 to operate the ratio selecting spool valve 72 in response to the rotational speed of the engine 5.

The high-pressure fluid passage 70 is connected to an inlet port 75 of the ratio selecting spool valve 72, the low-pressure fluid passage 71 to another inlet port 76, a supply passage 78 in communication with the port 43 to an outlet port 77, and a supply passage 80 in communication with the port 44 to another outlet port 79.

The first operating means 73 comprises a servo piston 82 slidably received within a cylinder 81, control coiled springs 83 and 84 interposed between the servo piston 82 and the ratio selecting spool valve 72, a rod 85 for operating the servo piston 82, an interlocking lever 86 pivotally connected at one end to an outer end of the rod 85 and at the other end to the throttle valve of the engine 5 for rotation about a fulcrum shaft 99 to transmit movement of a throttle valve, not shown, i.e. a change in the opening thereof, and a member 87 disposed to supply hydraulic fluid to the cylinder 81 in cooperation with the rod 85.

The rod 85 is slidably received in bores 88 and 89, which are axially formed within the servo piston 82 and the member 87, respectively, and is disposed to restrain the movement of the servo piston 82 relative to the rod 85 by means of snap rings 90 and 91 mounted on the rod 85 at opposite ends of the servo piston 82.

An annular chamber 92 is defined within the member 87 by the bore 89 and the rod 85, and is permanently supplied with high-pressure hydraulic fluid via a passage 93 branching off from the high-pressure fluid passage 70.

A passage 94 is axially formed in the rod 85 to provide a passage for hydraulic fluid in the chamber 92. The passage 94 communicates with the chamber 92 via a port 95 arranged at one end of the passage 94, and is provided at the other end thereof with a ball 96 for blocking the passage 94. Also, a port 98 communicates the passage 94 with a port 97 formed in the servo piston 82, so that hydraulic fluid flowing in the passage 94 enters the cylinder 85 when the port 97 is brought into communication with the port 98. When the pressure of hydraulic fluid in the cylinder 85 exceeds a predetermined value set by the control springs 83 and 84, the servo piston 82 is displaced in a direction away from the member 87 against the force of the control springs 83 and 84. Therefore, on this occasion, the ratio selecting spool valve 72 is acted upon by an urging force in an direction indicated (a) in FIG. 2.

In FIG. 2, the rod 85 is seen to assume a position corresponding to idle opening of the throttle valve, wherein the port 98 opening in the passage 94 is out of communication with the port 97 of the servo piston 82 to keep the servo piston 82 from moving in the cylinder 85. On this occasion, if the opening of the throttle valve is increased, then the interlocking lever 86 is caused to rotate about the fulcrum shaft 99 in a direction indicated by (c) in FIG. 2 to thereby displace the rod 85 in the direc-tion (a), and as the snap ring 91 is brought into contact with the servo piston 82 accordingly, the port 98 is brought into communication with the port 97, whereupon the servo piston 82 is pushed by hydraulic fluid in the direction (a). It is so arranged that the throttle valve opening becomes maximum when the rod 85 is displaced in the direction (a) to a position at which a stopper 100 provided on the rod 85 is in close proximity to one end of the member 87.

A hydraulic type centrifugal governor is employed as the operating means 74. The centrifugal governor is constructed such that it is controled by high pressure hydraulic fluid discharged from an orifice 101 of the ratio selecting spool valve 72. To be specific, the centrifugal governor comprises a governor shaft 104 slidably mounted within the casing 1 via bearings 102, 103, a gear 105 formed integrally with the governor shaft 104, a governor-housing 106 radially extending integrally from the governor shaft 104, a governor weight 108 slidably received within a cylinder 107 provided in one side of the governor housing 106, and a piston 110 slidably received within a cylinder 109 provided in the other side of the governor housing 106.

The gear 105 meshes with a gear 111 secured on the driving shaft 2 to thereby make via which the governor shaft 104 rotate in unison with the output shaft 6 of the engine 5.

The governor weight 108 is fitted on an end of a rod 112 of the piston 110 to thereby move in unison with the piston 110. The governor weight 108 is urged by a coiled spring 113 radially outwardly of the cylinder 107, but is prevented from slipping off the rod 112 and the cylinder 107, respectively, by a snap ring 114 and a snap ring 115. Normally, the governor weight 108 is urged by the spring 113 against the snap ring 115 as illustrated in FIG. 1. While the governor weight 108 assumes this position, the piston 110 is in an intermediate position with respect to the cylinder 109, wherein hydraulic fluid flows through a port 116 and a fluid guide passage 117 into the cylinder 109. A hydraulic fluid passage 118 is axially formed in the piston 110 and opening into the interior of the casing 1 at an end face of the cylinder 109. A port 119 communicates with the passage 118 at a location near the other end, which is disposed to be closed when the piston 110 is in the intermediate position.

The port 116 communicates with a cylinder 121 of the ratio selecting spool valve 72 via a supply passage 120 so that high pressure hydraulic fluid in the ratio selecting spool valve 72 is supplied to the centrifugal governor via the orifice 101, the supply passage 120, and the port 116.

In the centrifugal governor described as above, when the governor shaft 104 is rotated in unison with rotation of the output shaft 6 of the engine 5, a load Fig is created by rotation of the governor weight 108, etc. in a magnitude corresponding to the rotational speed. When the pressure of high pressure hydraulic fluid introduced into the cylinder 109 as noted before, exceeds the sum of a load Fig and a set load FisPG created by the spring 113, the piston 110 is urged by the hydraulic fluid pressure to be displaced in the cylinder 109. When the displacement of the piston 110 causes the port 119 to communicate with the cylinder 109, hydraulic fluid in the cylinder 109 is drained into the casing 1 through the passage 118. In this way, when the piston 110 assumes a position wherein the port 119 is out of communication with the cylinder 109, high pressure hydraulic fluid in the centrifugal governor acts to displace the ratio selecting spool valve 72 in the direction (b) in FIG. 2, whereas when the port 119 is brought in communication with the cylinder 109, the high pressure hydraulic fluid acting on the ratio selecting spool valve 72 is decreased as the registered opening area of the port 119 with the cylinder 109 increases.

The selecting operation of the ratio selecting spool valve 72 depends on the relationship between operating forces applied by the operating means 73 and 74. When operating force of the operating means 73 corresponding to the throttle valve opening is greater than that of the operating means 74 corresponding to the rotational speed of the output shaft 6 of the engine 5, the ratio selecting spool valve 72 is displaced in the direction (a), whereas when the former operating force is smaller than the latter one, the valve 72 is displaced in the direction (a). The supply passages 78, 80 connecting, respectively, with the high pressure fluid passages 70 and 80 are so located that when operating forces of the operating means 73 and 74 are balanced, the ratio selecting spool valve 72 assumes the changeover position. When operating force of the operating means 73 overcomes that of the operating means 74, the high-pressure fluid passage 70 communicates with the supply passage 80 which supplies hydraulic fluid to the movable pulley element 32 of the driven pulley 8, and at the same time the low-pressure fluid passage 71 communicates with the supply passage 78 which supplies hydraulic fluid to the movable pulley element 22 of the driving pulley 7. As a result, the pitch of the driven shaft pulley 8 is reduced and that of the driving pulley 7 is increased (as shown in FIG. 1).

On the other hand, when operating force of the operating means 74 overcomes that of the operating means 73, the high-pressure fluid passage 70 communicates with the supply passage 78 which supplies hydraulic fluid to the movable pulley element 22 of the driven pulley 7, and at the same time the low-pressure fluid passage 71 communicates with the supply passage 80 which supplies hydraulic fluid to the movable pulley element 32 of the driving pulley 8. As a result, the pitch of the driven shaft pulley 7 is reduced and that of the driving pulley 8 is increased.

Figure 5:
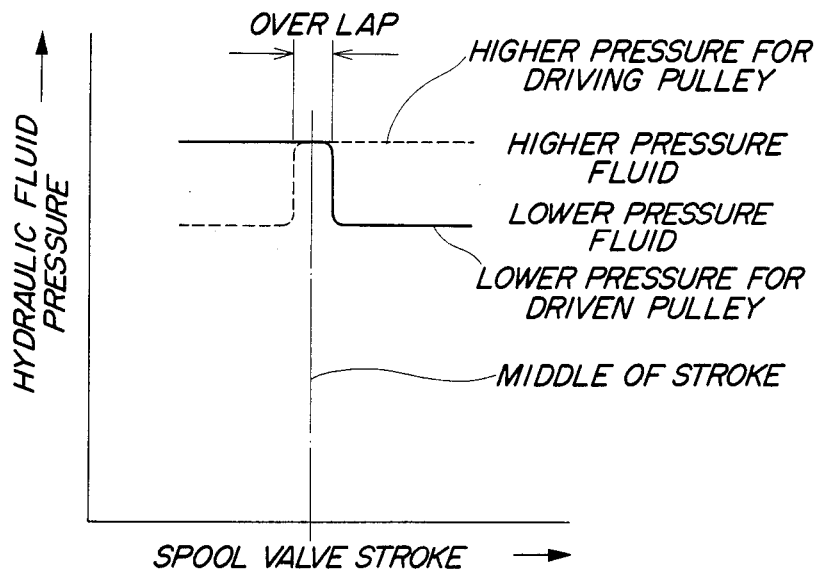
FIG. 5 is a graph illustrating the relationship between high pressure of hydraulic fluid and low pressure of hydraulic fluid which are selected by a ratio selecting sool valve, and the stroke of the spool valve; /

In FIG. 2 the ratio selecting spool valve 72 assumes an intermediate position in its stroke, in which, the high-pressure fluid passage 70 communicates with both of the supply passages 78 and 80 at the same time (the stroke range indicated as "overlap" in FIG. 5), whereby high pressure hydraulic fluid is supplied to the movable pulley element 22 of the driving pulley 7 and to the movable pulley element 32 of the driven pulley 8 at the same time.

A restriction 122 is provided in the low-pressure fluid passage 71. A fluid passage 124 branches off from the fluid passage 123, which communicates the pump 28 with the port 50, and is connected to the port 42 via a regulator valve (not shown). A fluid passage 125 branches off from the return passage 67, which communicates the oil tank 68 with the chamber 66, and is connected to the port 45. In FIG. 2, reference numeral 126 designates a filter.

In this embodiment, since the ratio selecting spool valve 72 is operated by the operating means 73 in response to the throttle valve opening of the engine 5, and by the operating means (hydraulic type centrifugal governor) 74 in response to the rotational speed of the output shaft 6, as stated above, it is possible to change the changeover point of the ratio selecting spool valve 72 by adjusting the set loads of the control springs 83 and 84 of the operational means 73 and also by adjusting the set load of the spring 113 of the operational means 74.

Also, since the control springs 83 and 84 of the operating means 73 are operated by the servo piston 82 as noted before, the operational load required for actuating the operating means 73 can be small, thereby enabling the operating means 73 to be operated in various manners.

The centrifugal governor employed as the operational means 74 in this embodiment is of such a type that can be operated by high pressure hydraulic fluid supplied through the orifice 101 of the ratio selecting spool valve 72, and therefore it can be simple in construction, compact in size, and light in weight, as compared with other conventional hydraulic type centrifugal governors.

Furthermore, by selecting the opening area of the restriction 122 in the low-pressure fluid passage 71, which communicates the chamber 57 of the pressure creating means 47 with the inlet port 76 of the ratio selecting spool valve 72, it is possible to obtain a desired velocity ratio selection speed by suitably restricting the amount of hydraulic fluid to be returned to the pressure creating means 47 from the supply passage 78 and/or 80, when the ratio selecting spool valve 72 is switched to a position for supplying the supply passage 78 and/or 80 with low pressure hydraulic fluid from a position for supplying same with high pressure hydraulic fluid, irrespective of whether the switching is effected to increase the transmission ratio or to decrease same. Conventionally, as a restriction of this type are used two restrictions, one of which is arranged across the high-pressure fluid passage 70, and the other across the low-pressure fluid passage 71, respectively. According to the conventional arrangement, however, the flow rate of hydraulic fluid in the high-pressure fluid passage 70 is also restricted by the restriction, whereby the belt tension may be lowered. On the other hand, the arrangement according to the present invention, in which only one restriction 122 is provided in the low-pressure fluid passage 71 alone, is free from such inconvenience, but it can rather attain a desired velocity selection speed as positively as in the conventional arrangement using two restrictions, since both hydraulic fluid returned from the driving pulley 7 and one from the driven pulley 8 are guided through the restriction 122.

Details of the hydraulic clutch 4 and a control device for controlling same will now be described.

The input rotating member 10 comprises a disc 10a fitted on the driving shaft 2 and secured thereto by means of bearings 18, to which is attached a clutch damper 12 of a known type, and outer gear 10 meshing with the gear 6a of the output shaft 6. Control means 215 for controlling a pressure regulating valve 214, hereinafter referred to, is mounted on the input rotating member 5 at its surface facing the output rotating member 11. The control means 215 is of a centrifugal governor type and has a cam plate 217 axially slidably received within a housing 216 riveted to the input rotating member 10, and balls 14 radially movably interposed between a cam surface 217a of the cam plate 217 and a guide surface 216a of the housing 216. The cam plate 217 is urged toward the input rotating member 10 by a coiled spring 220 interposed between the cam plate 217 and a spring seat member 219. When the rotational speed of the input shaft 6 is lower than a predetermined value, the balls 13 is biased in a radially inner position whereby the cam plate 217 is urgedly biased toward the input rotating member 10 by the force of the spring 16. As the rotational speed of the input shaft 6 increases above the predetermined value, the balls 13 move radially outward due to its own centrifugal force to cause the cam plate 217 to be correspondingly displaced toward the output rotating member 11 against the urging force of the spring 220.

The output rotating member 11 comprises the clutch cylinder 14 spline fitted on the drive shaft 2 secured thereto, and the clutch outer member 15 rigidly fitted on the clutch cylinder 14 in a manner prohibited from moving circumferentially or axially relative to the clutch cylinder 14. A clutch piston 16 as an urging member is axially slidably received within the cylinder 14 to be operated by a hydraulic fluid or pressurized oil introduced into a hydraulic pressure chamber 225 defined between the piston 16 and the cylinder 14, to urge clutch plates 17 as friction plates, hereinafter referred to. The piston 16 is urged by a belleville spring 226 toward the output rotating member 11.

The hydraulic pressure chamber 225 is supplied with hydraulic fluid via an inlet port 227 radially extending through a boss of the cylinder 14. A bore 228 serving as an outlet port of the hydraulic pressure chamber 225 is axially formed through the boss of the cylinder 14, within which the aforementioned pressure regulating valve 214 is slidably received. The bore 228 communicates at one end with the inlet port 227 and opens at its other end in an end face of the boss of the cylinder 14 facing the input rotating member 10. The pressure regulating valve 214 can move through a predetermined stroke in the axial direction of the drive shaft 2, and comprises a hollow cylindrical valve body having an open end and an closed other end. Radial outlet ports 229 are formed through the peripheral wall of the hollow valve body 214 at a location in the vicinity of its closed end.

When the rotational speed of the output shaft 6 is lower than the predetermined value, the pressure regulating valve 214 is biased toward the input rotating member 10 by the hydraulic fluid supplied through the inlet port 227, whereby the outlet ports 229 are open to discharge the hydraulic fluid within the hydraulic pressure chamber 225 through the outlet ports 229. Therefore, the pressure in the chamber 225 is not so high, thereby holding the piston 16 in a position biased toward the output rotating member 11 by the urging force of the spring 226. On the other hand, when the rotational speed of the output shaft 6 is higher than the predetermined value, the pressure regulating valve 214 is urgedly displaced by the cam plate 217 toward the output rotating member 11.

The clutch plate 17, which is disposed to be urged by the piston 16, is interposed between the input and output rotating members 10 and 11, and fitted in the clutch outer member 15 in urging contact with its inner peripheral surface in a manner circumferentially immovable but axially movable relative to the clutch outer member 15. A clutch facing 230 is interposed between the clutch plate 17 and an inner or lower end face of the clutch outer member 15, and fitted on the housing 216 in a manner such that it can move axially but is prohibited from moving circumferentially relative to the housing 216. When the piston 16 is actuated to urge the clutch plate 17 against the clutch outer member 15 via the clutch facing 230, torque is transmitted from the input rotating member 10 to the output rotating member 11, while the piston 16 is returned, power transmission between the input and output rotating members 10, 11 is interrupted.

The inlet port 227 is communicated with the hydraulic fluid introducing passage 19 extending along the axis of the driving shaft 2, via a groove 231 formed in the outer peripheral surface of the driving shaft 2 and a port 232 radially formed through the peripheral wall of the shaft 2.

Figure 6:
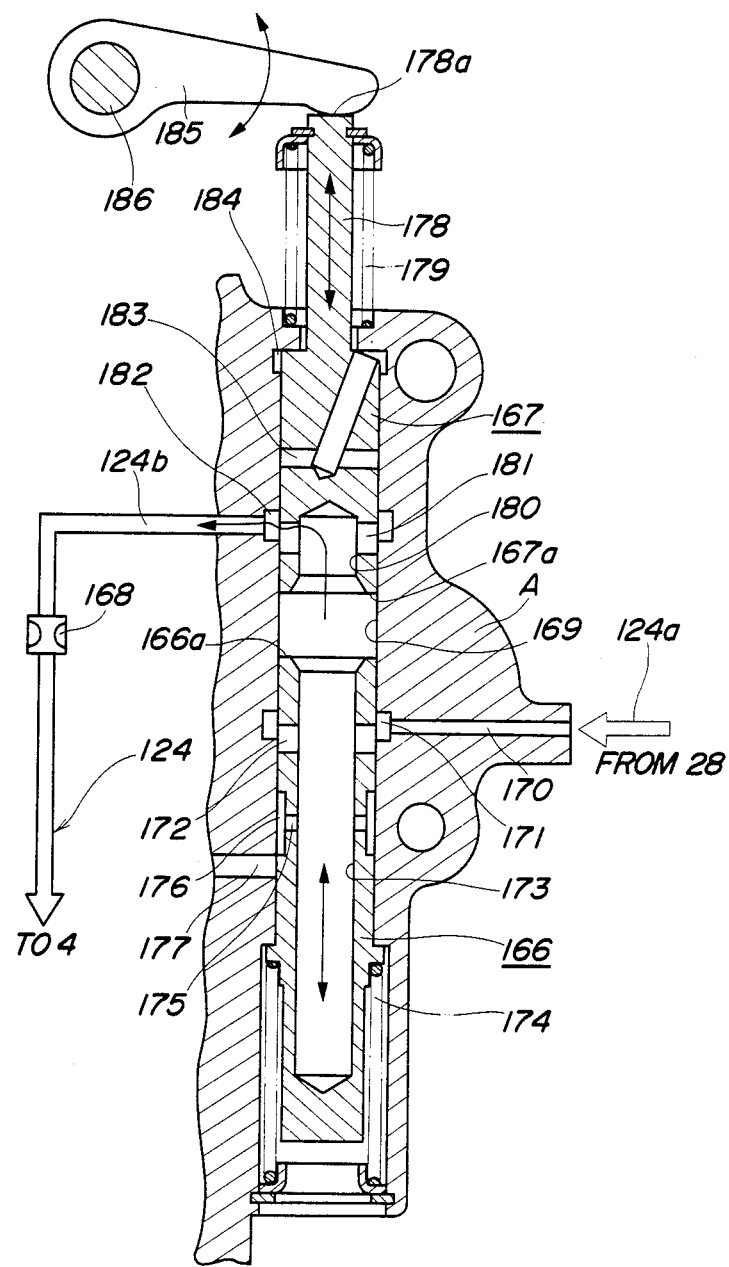
FIG. 6 is a sectional view illustrating the construction of a pressure regulating valve and a connection control valve of the infinitely variable transmission according to the invention.
Figure 7:
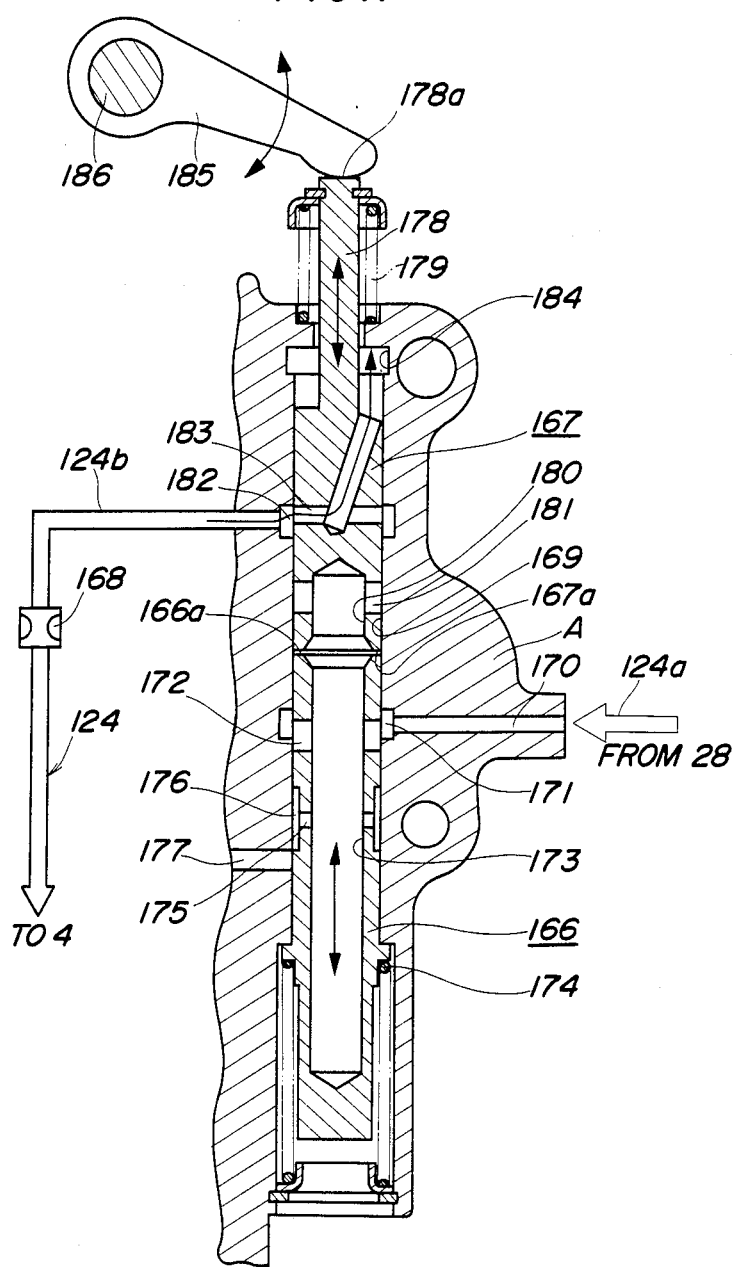
FIG. 7 is a similar view to FIG. 6, with the valves in different positions.

As shown in FIGS. 6 and 7, a pressure regulating valve 166 as pressure regulating means, a supply control valve 167 as supply control means, and a throttling valve 168 as an orifice are arranged in series in the order mentioned from the upstream side and across the supply passage 124. The pressure regulating valve 166 and the supply control valve 167 have a common valve housing formed integrally with the casing A at a suitable location therein and have their valve bodies fitted within a common cylinder 169 formed in the casing A.

When the pressure of hydraulic fluid introduced from an upstream portion of the supply passage 124 into the cylinder 169 via a fluid introducing passage 170, an annular chamber 171, a port 172, and an axial hole 173 exceeds a predetermined value set by the force of a valve spring 174, the pressure regulating valve 166 is displaced by the increased fluid pressure to compress the valve spring 174 to thereby regulate the opening degree of the inlet port 172 in response to the fluid pressure. When an annular chamber 176 of a port 175 is connected to an outlet port 177 as the pressure regulating valve 166 moves, hydraulic fluid is returned to the tank 68 via a return passage, not shown, at a flow rate corresponding to the opening degree of the outlet port 177 registered with the chamber 76.

The supply control valve 167 is intended to control the flow of hydraulic fluid introduced into the cylinder 169 to a downstream portion 124b of the supply passage 124. The valve 167 has its valve body located within the cylinder 169 and held at a predetermined distance from the valve body of the pressure regulating valve 166 by the force of a coiled return spring 179 fitted around an input rod 178. With the valve 167 in this position an outlet port 181 continuous with an axial bore 180 is disposed to connect with an annular chamber 182 whereby the hydraulic fluid discharged into the cylinder 169 from the pressure regulating valve 166 and thus regulated in pressure is delivered into the supply passage 124b via the axial hole 180, the outlet port 181, and the annular chamber 182, and therafter to the port 42 via the throttoing valve 168.

As the valve body of the valve 167 is further moved toward the pressure regulating valve 166 within the cylinder 169 against the force of a return spring 179 toward a position shown in FIG. 7, the outlet port 181 is blocked by the same valve body to interrupt the supply of hydraulic fluid into the supply passage 124b. When the valve body comes to a position wherein a lower end 167a of the valve 167 is in close proximity to an upper end 166a of the pressure regulating valve 166 as illustrated in FIG. 7, the hydraulic fluid within the supply passage 124b flows back into an drain port 183 via an annular chamber 182 then aligned with the port 183 and returned to the oil tank 68 via an annular chamber 184 and a return pipe, not shown, connected to the chamber 184.

The supply control valve 167 constructed as above is actuated by rotating a lever 185 for applying an urging force to an end 178a of the rod 178. The lever 185 is arranged to rotate about a stationary fulcrum shaft 186 from the extreme position in FIG. 6 to the extreme position in FIG. 7. The lever 185 is pivoted about the shaft 186 by means of an operating lever, not shown, which rotates the shaft 186 about its own axis as it is operated. The shaft 186 is locked in position when the lever 185 is either in the FIG. 8 position or in the FIG. 7 position.

The supply control valve 167 is normally biased in the open position in FIG. 6. If with the valve 167 in this open position, the engine 5 is started to cause the rotational speed of the engine output shaft 6 to increase above a predetermined value, and the pressure-regulated hydraulic fluid from the pressure regulating valve 166 is supplied to the starting clutch 4, the starting clutch 4 becomes engaged to actuate the infinitely variable transmission to transmit torque from the engine.

The transmission continues operating so long as the engine is operating with the supply control valve 167 in an open position. However, if the supply control valve 167 is switched into the FIG. 7 position or closed position with the transmission in the operative state, the pressure-regulated hydraulic fluid from the pressure regulating valve 166 is hindered from flowing into the supply passage 124b downstream of the valve 166, and at the same time the hydraulic fluid within the downstream supply passage 124b is drained to the tank 68 so that the pressure of hydraulic fluid to be supplied to the starting clutch 4 drops to almost zero. As a consequence, the starting clutch 4 remains disengaged even after the rotational speed of the output shaft 6 of the engine 5 rises above the predetermined value, to maintain the infinitely variable transmission in a neutral state wherein no transmission of torque takes place from the engine 5 to the transmission. The transmission is released from the neutral state when the supply control valve 167 is switched into an open position so that the starting clutch 4 becomes engaged to actuate the transmission to start transmitting torque from the engine 5.

Figure 8:
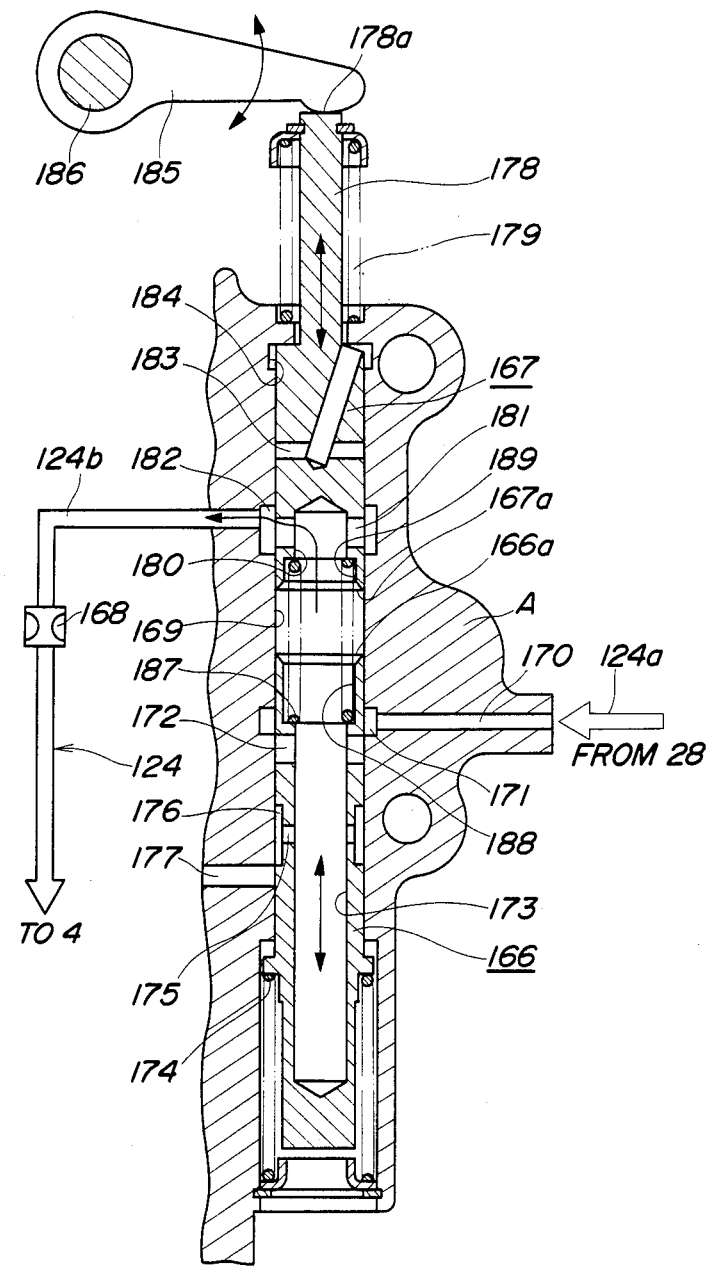
FIG. 8 is a similar view to FIG. 6, showing another embodiment.
Figure 9:
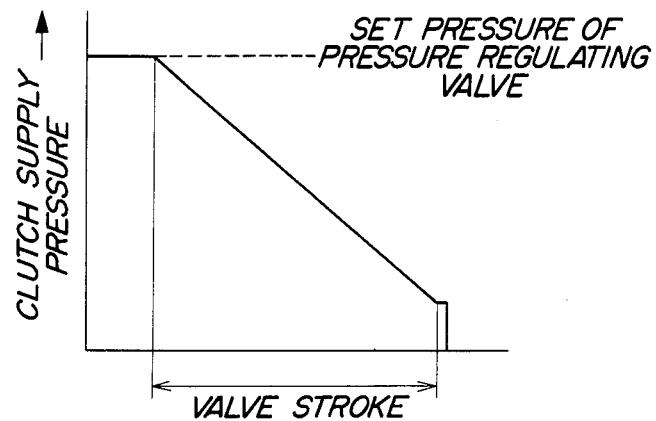
FIG. 9 is a graph showing the relationship between clutch operating pressure and the stroke of supply control valve of the embodiment of FIG. 8.

FIG. 8 shows a variation of the invention in which a control spring 187 formed by a coiled spring is interposed between the pressure regulating valve 166 and the supply control valve 167 to operatively connect them together. The control spring 187 acts to cause the pressure regulating valve 166 to be displaced in unison with movement of the supply control valve 167 as the latter is switched from an open position to a closed position and vice versa. As a result, the pressure of hydraulic fluid supplied to the starting clutch 4 is controlled to vary in proportion to the stroke executed by the supply control valve 167 as the latter is displaced within its effective stroke, as shown in FIG. 9, with the upper pressure limit determined by the setting regulating pressure of the pressure regulating valve 166. In this way, the arrangement of the invention can perform not only the function of opening and closing the supply control valve but also can control the torque that is transmitted by the starting clutch 5 so that the starting clutch can become smoothly engaged even when the rotational speed of the engine suddenly rises after the start of the engine such as at sudden acceleration from a standing position of the vehicle.

The control spring 187 has one end thereof fitted in a recess 188 formed in an upper end face of the valve body of the pressure regulating valve 166 and the other end in a recesss 189 formed in a lower end face of the valve body of the supply control valve 167.

Finally, referring to FIGS. 12, 13 and 14, the movable pulley element according to the invention will be described in detail.

The movable pulley element 22 essentially comprises the pulley main body 22b, the stationary piston element 23, and the closing plate 22d. The pulley main body 22b is provided with a bore 312 in which is slidably fitted the driving shaft 2, a conical disc-shaped portion 315 having a slanted surface 314 forming a V-shaped groove together with a slanted surface 313 of the stationary pulley element 20, and the cylindrical peripheral wall 22c axially and integrally extending from the rear side surface of the disc-shaped portion 315. An annular space S is defined between the cylindrical peripheral wall 22c and the outer peripheral surface of the driving shaft 2. The stationary piston element 23 is rigidly fitted on the driving shaft 2 in a manner immovable in the axial direction, and has an integral radially extending flange 23b arranged within the cylindrical peripheral wall 22c with its outer periphery in slidable contact with the inner peripheral surface 22c' of the cylindrical peripheral wall 22c of the pulley body 22b in a manner permitting axial movement of the pulley body 22b relative to the stationary piston element 23. The closing plate 22 is rigidly fitted within the cylindrical peripheral wall 22c within its outer periphery abutting with the inner peripheral surface 22c.

The pulley main body 22b is circumsferentially immovable relative to the shaft 2 via ball bearings 21 fitted in mutually opposed grooves 323, 324 axially formed, respectively, in the outer peripheral surface of the driving shaft 2 and the inner peripheral surface of the bore 312. An annular sealing member 327 is fitted between the outer peripheral surface 23b' of the flange 23b of the stationary piston element 23 and the inner peripheral surface 22c' of the cylindrical peripheral wall 22c, i.e. fitted in an annual groove 326 formed in the outer peripheral surface 23b', to maintain liquidtightness between the opposed surfaces 23b', 22c'.

In the movable pulley element 22 constructed as above, first and second hydraulic pressure chambers 24, 25 are defined within the annular space S. To be specific, the first pressure chamber 24 is defined between the conical disc-shaped portion 315 of the pulley main body 22b and the flange 23b of the stationary piston element 23, while the second pressure chamber 25 is defined between the flange 23b of the stationary piston element 23 and the closing plate 22d.

The first pressure chamber 24 is supplied with hydraulic fluid from the pump 28 shown in FIG. 2, via a port 43 formed in the casing 1 as shown by an arrow in FIG. 1, introducing passage 26 formed in the driving shaft 2 along its axis, and a port 332 radially extending through the peripheral wall of the driving shaft 2. When the hydraulic fluid is thus introduced into the first pressure chamber 24, the pulley main body 22b is moved along the drive shaft 2 toward the stationary pulley element 10 by the pressure of the fluid, whereby part of the fluid introduced into the first pressure chamber 24 flows into the second pressure chamber 25 via an orifice 333, hereinafter referred to. It can thus be avoided that an excessive pressure force in excess of the required pressure force acts upon the flange 23b in the first hydraulic pressure chamber 25 due to the centrifugal force, as hereinafter stated, whereby the pressure force in the first pressure chamber 24 can be held at the set desired pressure value.

The driven pulley 8 comprises a conical disc-shaped stationary pulley element 30 formed integrally on the driven shaft 3, and a movable pulley element 32 arranged opposite the stationally pulley element 30 and fitted on the driven shaft 3 in a manner axially movable but circumferentially immovable relative to the driven shaft 3.

The movable pulley element 32 essentially comprises the pulley body 32b, the stationary piston element 33, and the closing plate 32d. The pulley main body 32b is provided with a bore 336 in which is slidably fitted the driven shaft 3, a conical disc-shaped portion 339 having a slanted surface 338 forming a V-shaped groove together with a slanted surface 337 of the stationary pulley element 30, and the cylindrical peripheral wall 32c axially and integrally extending from the rear side surface of the disc-shaped portion 339. An annular space S' is defined between the cylindrical peripheral wall 32c and the outer peripheral surface of the driven shaft 3. The stationary piston element 33 is rigidly fitted on the driven shaft 3 in a manner immovable in the axial direction, and has an integral radially extending flange 33b arranged within the cylindrical peripheral wall 32c with its outer periphery in slidable contact with the inner peripheral surface 32c' of the cylindrical peripheral wall 32c of the pulley body 32b in a manner permitting axial movement of the pulley body 32b relative to the stationary piston element 33. The closing plate 32d is rigidly fitted within the cylindrical peripheral wall 32c within its outer periphery abutting with the inner peripheral surface 32c'. The coiled spring 34 is interposed between the conical disc-shaped portion 339 of the pulley main body 32b and the flange 33b of the stationary piston element 33, to impart appropriate tension to the endless belt 9 as well as to bias the movable pulley element 32 in a lower speed-providing or initial position during stoppage of the engine. The pulley main body 32b is held circumferentially immovable relative to the driven shaft 3 by means of balls 31 fitted in grooves 348, 349 axially formed, respectively, in the outer peripheral surface of the driven shaft 3 and the inner peripheral surface of the bore 336.

In the movable pulley element 32 constructed as above, first and second hydraulic pressure chambers 35, 36 are defined within the annular space S'. To be specific, the first pressure chamber 35 is defined between the conical disc-shaped portion 339 of the pulley main body 32b and the flange 33b of the stationary piston element 33, while the second pressure chamber 36 is defined between the flange 33b the stationary piston element 33 and the closing plate 32d.

The first pressure chamber 35 is supplied with hydraulic fluid from the pump 28 shown in FIG. 2, via a port 44 formed in the casing 1 as shown by an arrow in FIG. 1, an introducing passage 38 formed in the driving shaft 2 along its axis, and a port 39 radially extending through the peripheral wall of the driving shaft 2. When the hydraulic fluid is thus introduced into the first pressure chamber 35, the pulley main body 32b is moved along the drive shaft 2 toward the stationary pulley element 30 by the pressure of the fluid, whereby part of the fluid introduced into the first pressure chamber 35 flows into the second pressure chamber 36 via an orifice 358, hereinafter referred to. It can thus be avoided that an excessive pressure force in excess of the required pressure force acts upon the flange 33b in the first hydraulic pressure chamber 36 due to the centrifugal force, as hereinafter stated, whereby the presure force in the first pressure chamber 35 can be held at the set desired pressure value.

Figure 12:
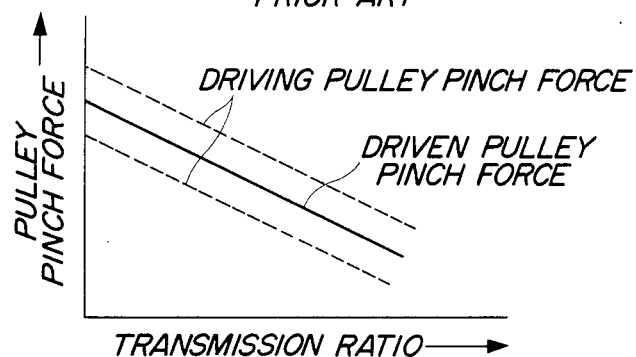
FIG. 12 is a graph showing pulley pinch force characteristics of a conventional infinitely variable transmission.
Figure 13:
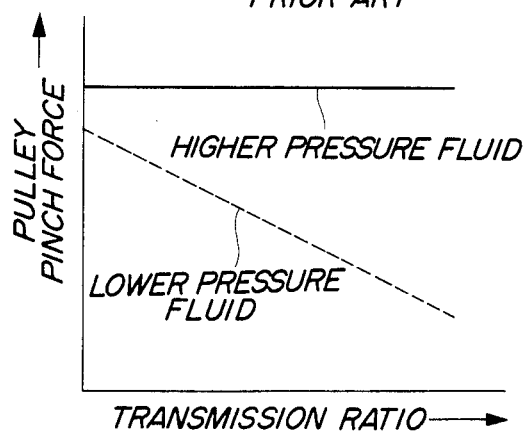
FIG. 13 is a similar graph to FIG. 12, showing the same characteristics of another conventional infinitely vairable transmission.
Figure 14:
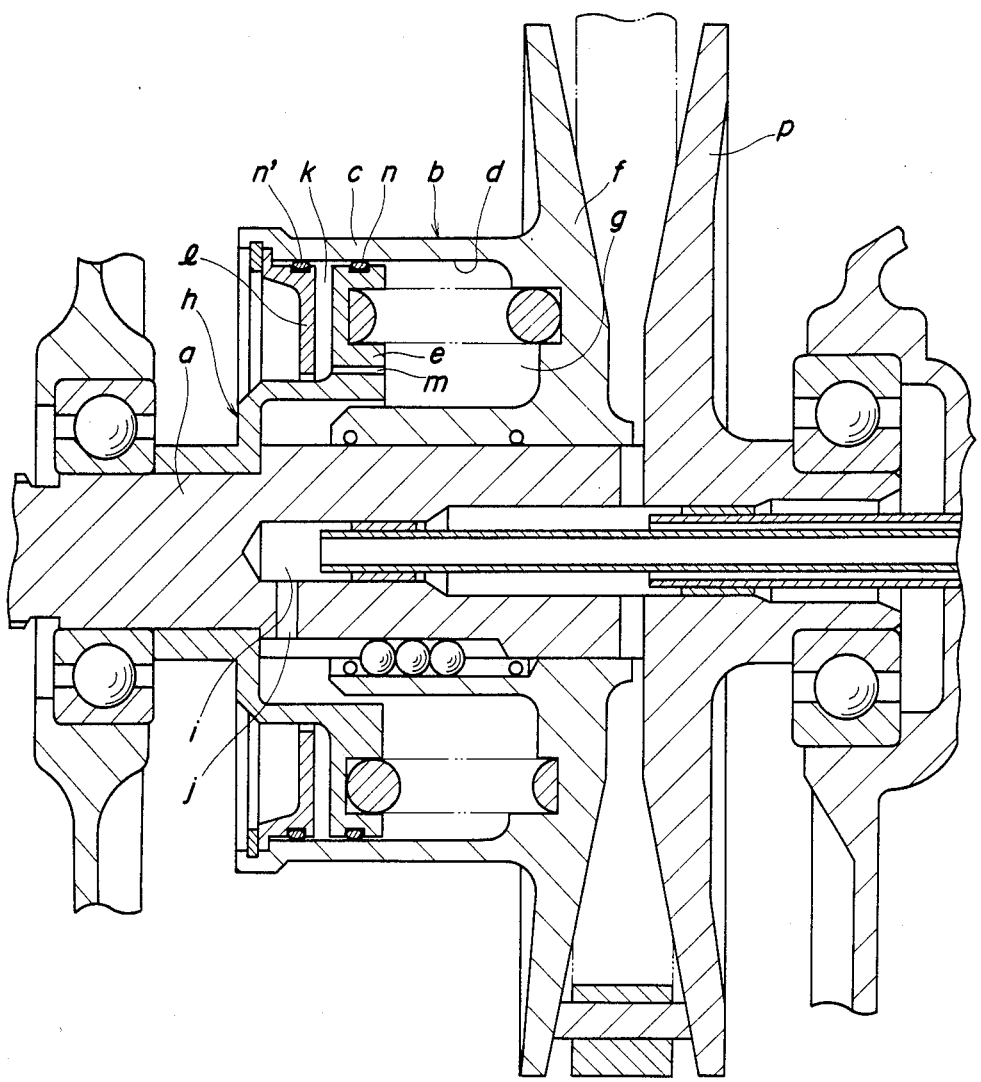
FIG. 14 is a similar view to FIG. 10, showing a movable pulley element of a conventional infinitely variable transmission.

The orifices 333, 358 in the movable pulley element 22 of the driving pulley 7 and the movable pulley element 32 of the driven pulley 8 are each formed by a clearance 361 between mutually spaced and opposed end faces 359 and 360 of the sealing member 327 or the sealing member 352, and a clearance 362 between the inner peripheral surface 22c' of the cylindrical peripheral wall 22c' or the inner inner peripheral surface 32c' of the cylindrical peripheral wall 32c and the outer peripheral surface 23b' of the flange 23b or the outer peripheral surface 33b' of the flange 33b, as shown respectively in FIGS. 12 and 13.

The sealing members 327 and 352 may be formed of metal, rubber, resin, or a like material, In the illustrated embodiment, a C-shaped FC ring is used as the sealing member, which has mutually spaced and opposed and faces 359, 360.

The sectional areas of the orifices 333 and 358 can be freely set to desired values by selecting the dimensions of the clearances 361 and 362, whereby to thereby enable to set the amount of hydraulic fluid that leaks from the first pressure chamber 24, 35 into the second pressure chamber 25, 36 to desired values.

Further, the use of a C-shaped FC ring to form the orifice 333, 358 by the clearance 361 between the opposed end faces 359, 360 dispenses with the need of machining the stationary pulley element as in the conventional art. If the sealing members 327, 352 are formed by ring members formed of resin, a through bore has to be formed through the ring member to form the orifice. However, by virtue of the simple configuration of ordinary sealing members 327, 352, the drilling operation can be carried out with ease by means of a lower cost machining tool.

Further, since the orifices 333, 358 are provided in the sealing members 327, 352 in contact with the inner peripheral walls, 22c, 32c, that is, the orifices 333, 358 are located at a radially outer location in the annular space S, S', part of the hydraulic fluid can positively leak from the first hydraulic pressure chamber 24, 35 to the second hydraulic pressure chamber 25, 36, from the beginning of supplying of hydraulic fluid into the chambers 24, 35.

What is claimed is:

1. In an infinitely variable transmission of the type including a driving shaft, a driven shaft, a driving pulley composed of a first stationary pulley element and a first movable pulley element both provided on the driving shaft, a driven pulley composed of a second stationary pulley element and a second movable pulley element both provided on the driven shaft, an endless belt wound around the driving pulley and the driven pulley for connecting between the driving shaft and the driven shaft for transmitting power from the former to the latter, and a hydraulic fluid supply source for supplying a hydraulic fluid to the first and second movable pulley elements, wherein the first and second movable pulley elements are axially displaceable relative to respective ones of the first and second stationary pulley elements by means of the hydraulic fluid from the hydraulic fluid supply source, to vary the distances between the first and second movable pulley elements and the respective ones of the stationary pulley elements and accordingly the velocity ratio between the driving shaft and the driven shaft, the improvement comprising:

control means operatively connected between the first and second movable pulley elements and the hydraulic fluid supply source, the control means comprising pressure creating means for creating a lower pressure fluid and a higher pressure fluid from the hydraulic fluid from the hydraulic fluid supply source, with a constant pressure difference between the lower pressure fluid and the higher pressure fluid, modulating means for varying pressure values of the lower pressure fluid and the higher pressure fluid created by the pressure creating means while maintaining said constant pressure difference in response to a velocity ratio between the driving shaft and the driven shaft, and selective supply means for selectively supplying the lower pressure fluid created by the pressure creating means and varied by the modulating means and the higher pressure fluid created by the pressure creating means to the first movable pulley element and the second movable pulley element.

2. An infinitely variable transmission as claimed in claim 1, wherein the modulating means comprises a stationary cylinder disposed to be supplied with the hydraulic fluid, a movable cylinder slidably fitted within the stationary cylinder for axial movement therein in response to a change in the velocity ratio between the driving and driven shafts, a piston slidably fitted within the movable cylinder, spring means permanently urging the piston in one direction, a hydraulic fluid tank, and port means provided in the peripheral wall of the movable cylinder at such a location as to be closeable by the piston and communicating with the hydraulic fluid tank, the piston being responsive to the pressure of the lower pressure fluid from the pressure creating means for axial movement against the force of the spring means in a direction of the port means being opened to drain the hydraulic pressure fluid from the stationary cylinder to the hydraulic fluid tank.

3. An infinitely variable transmission as claimed in claim 1, further including:

a hydraulic clutch adapted to be engaged and transmit power from a prime mover connected with the driving shaft to the driving shaft when the rotational speed of the prime mover is higher than a predetermined value, pressure regulating means for regulating the pressure of the hydraulic fluid being supplied to the hydraulic clutch to a predetermined level, a hydraulic fluid supply passageway connecting between the hydraulic clutch and the pressure regulating means, supply control means arranged across the hydraulic fluid supply passageway and operable to selectively close and open same irrespective of the rotational speed of said prime mover, and drain means leading to the hydraulic fluid tank and operatively connected to the supply control means for allowing hydraulic fluid to escape from the hydraulic clutch to the hydraulic fluid tank when the hydraulic fluid supply passageway is closed by the supply control means.

4. An infinitely variable transmission as claimed in claim 3, wherein the pressure regulating means comprises a cylinder, a first valve body axially slidably received within the cylinder, and a first spring arranged at one end of the first valve body, the supply control means comprising a second valve body axially slidably received within the cylinder, and a second spring interposed between the first and second valve bodies and disposed to urge the first valve body against the force of the first spring such that displacement of one of the first and second valve bodies causes displacement of the other valve body.

5. An infinitely variable transmission as claimed in claim 1,2,3,4, wherien at least one movable pulley element of the driving pulley and driven pulley comprises: a pulley main body axially slidably fitted on a corresponding one of the driving shaft and driven shaft while being circumferentially immovable, the pulley main body having a conical disc-shaped portion, and a hollow cylindrical portion axially extending from the conical disc-shaped portion and defining therein an annular space; a stationary piston element having a radially extending annular flange portion fitted in the annular space of the pulley main body in a manner permitting axial movement of the pulley main body relative thereto while being axially immovable, wherein a first hydraulic pressure chamber is defined in the annular space of the pulley main body and between the conical disc-shaped portion of the pulley main body and the radially extending annular flange portion and disposed to be supplied from hydraulic fluid from the hydraulic fluid supply source; an annular closing element rigidly fitted in the annular space of the pulley main body at a side remote from the conical disc-shaped portion with respect to the stationary piston element wherein a second hydraulic pressure chamber is defined in the annular space of the pulley main body and between the annular closing element and the radially extending annular flange portion of the stationary piston element; and a sealing element fitted in an outer peripheral surface of the radially extending annular flange portion of the stationary piston element for maintaining liquidtightness between an outer peripheral surface of the radially extending annular flange portion and an associated inner peripheral surface of the annular space of the pulley main body, the sealing element having at least one orifice formed therein and communicating between the first and second hydraulic pressure chambers whereby as the pulley main body is axially displaced relative to the corresponding one of the driving shaft and driven shaft by the pressure of hydraulic fluid supplied to the first hydraulic pressure chamber from the hydraulic fluid supply source, part of the hydraulic fluid escapes from the first hydraulic pressure chamber to the second hydraulic pressure chamber through the at least one orifice.

6. An infinitely variable transmission as claimed in claim 5, wherein the sealing member comprises a C-shaped member having opoposite end faces disposed opposite and spaced from each other.

7. In an infinitely variable transmission of the type including a driving shaft, a driven shaft, a driving pulley composed of a first stationary pulley element and a first movable pulley element both provided on the driving shaft, a driven pulley composed of a second stationary pulley element and a second movable pulley element both provided on the driven shaft, an endless belt wound around the driving pulley and the driven pulley for connecting between the driving shaft and the driven shaft for transmitting power from the former to the latter, a hydraulic fluid supply source for supplying a hydraulic fluid to the first and second movable pulley elements, wherein the first and second movable pulley elements are axially displaceable relative to respective ones of the first and second stationary pulley elements by means of the hydraulic fluid from the hydraulic fluid supply source, to vary the distances between the first and second movable pulley elements and the respective ones of the stationary pulley elements and accordingly the velocity ratio between the driving shaft and the driven shaft, a hydraulic clutch adapted to be engaged and transmit power from a prime mover connected with the driving shaft to the driving shaft when the rotational speed of the prime mover is higher than a predetermiend value pressure regulating means for regulating the pressure of the hydraulic fluid being supplied to the hydraulic clutch to a predetermined level, and a hydraulic fluid supply passageway connecting between the hydraulic clutch and the pressure regulating means, the improvement comprising:

supply control means arranged across the hydraulic fluid supply passageway and operable to selectively close and open same irrespective of the rotational speed of said prime mover, and drain means leading to the hydraulic fluid tank and operatively connected to the supply control means for allowing hydraulic fluid to escape from the hydraulic clutch to the hydraulic fluid tank when the hydraulic fluid supply passageway is closed by the supply control means, the supply control means and the pressure regulating means having their valve bodies fitted within a common cylinder.

8. In an infinitely variable transmission of the type including a driving shaft, a driven shaft, a driving pulley composed of a first stationary pulley element and a first movable pulley element both provided on the driving shaft, a driven pulley composed of a second stational pulley element and a second movable pulley element both provided on the driven shaft, an endless belt wound around the driving pulley and the driven pulley for connecting between the driving shaft and the driven shaft for transmitting power from the former to the latter, and a hydraulic fluid supply source for supplying a hydraulic fluid to the first and second movable pulley elements, wherein the first and second movable pulley elements are axially displaceable relative to respective ones of the first and second stationary pulley elements by means of the hydraulic fluid from the hydraulic fluid supply source, to vary the distances between the first and second movable pulley elements and the respective ones of the stationary pulley elements and accordingly the velocity ratio between the driving shaft and the driven shaft, at least one movable pulley element of the driving pulley and driven pulley comprising a pulley main body axially slidably fitted on a corresponding one of the driving shaft and driven shaft while being circumferentially immovable, the pulley main body having a conical disc-shaped portion, and a hollow cylindrical portion axially extending from the conical disc-shaped portion and defining therein an annular space, a stationary piston elements having a radially extending annular flange portion fitted in the annular space of the pulley main body in a manner permitting axial movement of the pulley main body relative thereto while being axially immovable, wherein a first hydraulic pressure chamber is defined in the annular space of the pulley main body and between the conical disc-shaped portion of the pulley main body and the radially extending annular flange portion and disposed to be supplied with hydraulic fluid from the hydraulic fluid supply source; an annular closing element rigidly fitted in the annular space of the pulley main body at a side remote from the conical disc-shaped portion with respect to the stationary piston element wherein a second hydraulic pressure chamber is defined in the annular space of the pulley main body and between the annular closing element and the radially extending annular flange portion of the stationary piston element, and a sealing element fitted in an outer peripheral surface of the radially extending annular flange portion of the stationary piston element for maintaining liquidtightness between the outer peripheral surface of the radially extending annular flange portion and an associated inner peripheral surface of the annular space of the pulley main body, the improvement wherein the sealing element has at least one orifice formed therein and communicating between the first and second hydraulic pressure chambers whereby as the pulley main body is axially displaced relative to the corresponding one of the driving shaft and driven shaft by the pressure of hydraulic fluid supplied to the first hydraulic pressure chamber from the hydraulic fluid supply source, part of the hydraulic fluid escapes from the first hydraulic pressure chamber to the second hydraulic pressure chamber through the at least one orifice.

9. An infinitely variable transmission as claimed in claim 2, including a hydraulic clutch adapted to be engaged and transmit power from a prime mover connected with the driving shaft to the driving shaft when the rotational speed of the prime mover is higher than a predetermined value, pressure regulating means for regulating the pressure of the hydraulic fluid being supplied to the hydraulic clutch to a predetermined level, a hydraulic fluid supply passageway connecting between the hydraulic clutch and the pressure regulating means, supply control means arranged across the hydraulic fluid supply passageway and operable to selectively close and open same, and drain means leading to the hydraulic fluid tank and operatively connected to the supply control means for allowing hydraulic fluid to escape from the hydraulic clutch to the hydraulic fluid tank when the hydraulic fluid supply passageway is closed by the supply control means.

10. In an infinitely variable transmission of the type including a driving shaft, a driven shaft, a driving pulley composed of a first stationary pulley element and a first movable pulley element both provided on the driving shaft, a driven pulley composed of a second stationary pulley element and a second movable pulley element both provided on the driven shaft, an endless belt wound around the driving pulley and the driven pulley for connecting between the driving shaft and the driven shaft for transmitting power from the former to the latter, and a hydraulic fluid supply source for supplying a hydraulic fluid to the first and second movable pulley elements, wherein the first and second movable pulley elements are axially displaceable relative to respective ones of the first and second stationary pulley elements by means of the hydraulic fluid from the hydraulic fluid supply source, to vary the distances between the first and second movable pulley elements and the respective ones of the stationary pulley elements and accordingly the velocity ratio between the driving shaft and the driven shaft, the improvement comprising:

control means operatively connected between the first and second movable pulley elements and the hydraulic fluid supply source, the control means comprising pressure creating means for creating a lower pressure fluid and a higher pressure fluid from the hydraulic fluid from the hydraulic fluid supply source, with a constant pressure difference between the lower pressure fluid and the higher pressure fluid, modulating means for varying a pressure value of the lower pressure fluid created by the pressure creating means in response to a velocity ratio between the driving shaft and the driven shaft, and selective supply means for selectively supplying the lower pressure fluid created by the pressure creating means and varied by the modulating means and the higher pressure fluid created by the pressure creating means to the first movable pulley element and the second movable pulley element;

at least one movable pulley element of the driving pulley and driven pulley comprising a pulley main body axially slidably fitted on a corrresponding one of the driving shaft and driven shaft whilel being circumferentially immovable, the pulley main body having a conical disc-shaped portion, and a hollow cylindrical portion axially extending from the conical disc-shaped portion and defining therein an annular space;

a stationary piston element having radially extending annular flange portion fitted in the annular space of the pulley main body in a manner permitting axial movement of the pulley main body relative thereto while being axially immovable, wherein a first hydraulic pressure chamber is defined in the annular space of the pulley main body and between the conical disc-shaped portion of the pulley main body and the radially extending annular flange portion and disposed to be supplied with hydraulic fluid from the hydraulic fluid supply source;

an annular closing element rigidly fitted in the annular space of the pulley main body at a side remote from the conical disc-shaped portion with respect to the stationary piston element wherein a second hydraulic pressure chamber is defined in the annular space of the pulley main body and between the annular closing element and the radially extending annular flange portion of the stationary piston element; and a sealing element fitted in an outer peripheral surface of the radially extending annular flange portion of the stationary piston element for maintaining liquid tightness between an outer peripheral surface of the radially extending annular flange portion and an associated inner peripheral surface of the annular space of the pulley main body, the sealing element having at least one orifice formed therein and communicating between the first and second hydraulic pressure chambers, whereby as the pulley main body is axially displaced relative to the corresponding one of the driving shaft and driven shaft by the pressure of hydraulic fluid supplied to the first hydraulic pressure chamber from the hydraulic fluid supply source, part of the hydraulic fluid escapes from the first hydraulic pressure chamber to the second hydraulic pressure chamber through the at least one orifice.

11. An infinitely variable transmission as claimed in claim 10, wherein the sealing member comprises a C-shaped member having opposite end faces disposed opposite and spaced from each other.

12. An infinitely variable transmission as claimed in claim 7, wherein a compression spring is interposed between said valve bodies of the supply control means and the pressure regulating means fitted within said common cylinder, whereby the supply control means and the pressure regulating mesn are movable together through said compression spring.

* * * * *

UNITED STATES PATENT AND TRADEMARK OFFICE
CERTIFICATE OF CORRECTION

PATENT NO. : 4,716,791

DATED : January 5, 1988

INVENTOR(S) : Kohei Ohzono, Mitsuru Saito and Kiyotaka Hayashi

It is certified that error appears in the above-identified patent and that said Letters Patent is hereby corrected as shown below:

On the cover page, Item [30] Foreign Application Priority Data, change "60-0934700[U] to "60-034700[U].

Signed and Sealed this

Twelfth Day of July, 1988

Attest:

DONALD J. QUIGG

*Attesting Officer*     *Commissioner of Patents and Trademarks*